Patented Oct. 30, 1951

2,573,268

UNITED STATES PATENT OFFICE 2,573,268

DICHLOROPYRAZINES AND PROCESS OF PREPARING SAME

Alexander A. Miller, Madison, Wis., assignor to American Cyanamid Company, New York, N. Y., a corporation of Maine No Drawing. Application May 8, 1948, Serial No. 25,987

7 Claims. (Cl. 260—250)

This invention relates to polyhalogenopyrazines and to a novel process of preparing these compounds. More particularly, it relates to the polyhalogenation of monohalogenopyrazines. Specifically, it is concerned with the carrying out of the reaction in the vapor phase at elevated temperatures to produce di-, tri- and tetrahalogen-substituted pyrazine. Preparation of similar products directly from pyrazines forms the subject-matter of my copending application with James Kenneth Dixon, Serial No. 25,985, now Patent No. 2,540,476, filed of even date.

In the present specification the term "halogenopyrazines" is used to designate only pyrazine, and pyrazine, chlorine or bromine substituted on a ring carbon. Isomeric dichloro- and dibromopyrazines, tribromopyrazine and tetrachloropyrazine may be obtained in accordance with the present invention. The isomeric dichloropyrazines are believed to be new compounds.

In the past there has been available but little useful information on polyhalogenopyrazines. This has been due to a number of factors. Solid or liquid pyrazine, for example, is so rapidly attacked by pure halogens that only carbonaceous decomposition products are obtained. The decomposition is so rapid that it is impossible to ascertain whether or not any halogenation originally occurs. Similar results are obtained in attempts to pass gaseous halogen through pyrazine in solution. It has always been postulated that the pyrazine ring structure is too unstable for direct halogenation.

Subsequently, Sayward, U. S. Patent 2,391,745, and Winnek, U. S. Patent 2,396,066 found that this generality could be modified somewhat with regard to the vapor phase. They found that under certain suitable conditions, and/or with a suitable catalyst, chlorination of the ring could be carried out. However, they obtained not the expected mixture of mono- and polyhalogenated pyrazines but substantially only monohalogenopyrazine.

Surprisingly, it has been found that in spite of the violent exothermic reaction causing the rapid deterioration of pyrazine in the presence of the pure halogen, the activity rapidly decreases. A monohalogenopyrazine in the liquid state is substantially inert to pure halogens. An effective halogenation in the liquid phase does not appear to be capable of being carried out.

Such dihalogenopyrazines as were known prior to the present invention were, therefore, of necessity prepared by indirect methods. These latter are neither useful for the general production of di-, tri- and tetra-halogenopyrazines nor suitable for development on a commercially feasible basis. Nevertheless, polyhalogenopyrazines, such as dichloropyrazine, have indicated very promising utility in such varied fields as the production of insecticides, synthetic fibers, detergents, and ionic resins. As a result, interest in suitable methods for commercial product has been increasing.

It is, therefore, the object of the present invention to provide a suitable method for the production, by direct halogenation, of polyhalogenopyrazines. Further objects of the invention are to produce these compounds by a vapor phase reaction under conditions readily controlled and readily duplicated and to determine the conditions under which commercially feasible results may be obtained.

In view of the prior knowledge in the art, it is surprising that the objects of the present invention may be readily accomplished by halogenating a monohalogenopyrazine in the vapor phase. Objects of the present invention are capable of being accomplished by halogenating a monohalogenopyrazine in the vapor phase. In the case of the production of monohalogenopyrazines, activity in the vapor phase was capable of control. In the liquid phase it was not. Here the activity in the liquid phase is very small. In the vapor phase it is increased rather than being decreased.

Broadly, the objects of the present invention were accomplished in a single continuous relatively simple operation. A monohalogenopyrazine is used as the starting material. It may be obtained in any desired manner, for example, in accordance with the teachings of Sayward or Winnek, noted above, or by one of the known direct methods. The monohalogenopyrazine and additional halogen, both in vapor state, and preferably, but not necessarily, preheated to approximately reaction temperature, are passed through a suitable heated conversion chamber. A through-put rate is established such that the reactants are held at the necessary temperature for sufficient time to complete the reaction. Reaction being accomplished, the reacted mixture is subjected to condensation. The condensate is collected, neutralized to overcome any hydrohalide, and the products isolated by distillation.

While the process is essentially simple, there are a number of factors or controls for which compensation must be made. First, the proportions between the amounts of monohalogenopyrazine and the halogen that are used will vary with the product desired. Regardless of the theoretical possibilities, the actual condensates apparently will always comprise some mono-, di-, and tri- or tetrahalogenated pyrazines, unless, of course, previous substitution of other radicals prevents that degree of halogenation. Initial feed ratios of about 1:1 yield products which are largely the disubstituted pyrazines. Increasing the monohalogenopyrazine:halogen ratio above about 1:1 initially tends to increase the yield of disubstituted product. However, as the ratio approaches 1:2 conditions soon begin to favor the production of trihalogeno and/or tetrahalogeno products. Theoretically, the ratio of 1:3 should be correct for obtaining the tetra-substituted product. Actually, more, up to ratios of about 1:4 and 1:5 may be advantageous.

Other than a question of economic waste or the necessity for recovering unused halogen, there is no objection to the use of an excess. Accordingly, a sufficient amount should be used to insure the maximum production of the desired product even though this may require more than the theoretically correct amount. This is in direct contrast with the usual practice in attempting to produce monohalogenopyrazines, in which process it was always considered that an excess of pyrazine should be used to insure utilization of all the halogen before condensation, thereby preventing loss of pyrazine in the condensate by reaction.

Of more importance in controlling the reaction and the nature of the product is the temperature factor. This cannot be divorced from the other considerations since it will vary with the particular halogen being used, with the proportions of halogenopyrazine to halogen in the feed and with the time of contact.

Presumably, any of the halogens could be employed in the present invention. Actually the present invention is concerned with chlorine and bromine. Chlorine is the more readily substituted. In general, bromination will require reaction temperatures about 100°–150° C. higher than required for chlorination. Taking chlorine as illustrative, little or no reaction takes place below about 300–325° C. The latter is therefore about the practicable minimum limit. Yields appear to improve as this temperature is raised to about 500° C., or to 625° C. in the case of bromine. Temperatures above about 500° C. in the case of chlorine and 625° C. with bromine should be avoided as tending to produce side reactions. Above about 525° C. for chlorine and 625° C. for bromine the reaction becomes impractical.

These upper temperature limitations are average for the latter part of the reaction. It is substantially impossible to prevent some overheating locally. However, this is not harmful unless the temperature is held there for sufficient time to cause a marked increase in the overall average. For some reason not wholly understood, the higher halogenation favors the production of the tetra-substituted product in the case of chlorine and the tri-substituted product in the case of bromine.

Since there is little or no reaction at temperatures up to the noted minimums, preheating to within about 50° C. of the reaction temperature is very helpful, particularly in increasing the capacity of a fixed apparatus. Separate preheating of the vaporized monohalogenated-pyrazine and the halogen is preferred. However, because reaction is so slight at the preheat temperatures used, the vapors may be effectively preheated after admixture if so desired.

In general, two factors can be used to control the temperature, namely, the controlled addition of halogen and the use of an extraneous gas or vapor. As has been noted, the violence of the reaction becomes progressively reduced after the first halogen is substituted. Since the present process starts with a monohalogenated product, the temperature problem is not serious. In many instances heating is required to complete substitution of the last halogen.

Use of an extraneous gas or vapor diluent, however, is also a useful expedient. While not essential in temperature control, it does serve a useful purpose therein in making for a simpler correlation between temperature and contact time. Further, water vapor appears to have a beneficial effect on the process other than that capable of explanation by mere dilution. Where a diluent is used, therefore, water vapor is to be preferred. Others that may be used are carbon tetrachloride, nitrogen and carbon dioxide. Excessive amounts of diluent should be avoided as requiring excessive contact time and thereby not only decreasing the capacity of the apparatus but tending to favor side reactions. Pyrazine:diluent mol ratios of from 1:2 up to about 1:10 are permissible without adverse effect, 1:3–1:6 ratios being good general practice.

As to the contact time, the selection depends on the interrelation of the other factors. At higher temperatures less time is required. At higher pyrazine-halogen ratios less time is required not only because of the mass action effect but because, in the early stages at least, too rapid substitution tends to increase the temperature very rapidly. The contact time will also vary from about 0.5–50.0 seconds, usually from 2–15 seconds, in accordance with whether a di-, tri- or tetra-substituted product is desired and is therefore being favored. If the theoretical amount of halogen or a greater amount is present, longer contact time in general finds increased production of the higher substituted products.

Since chlorine substitution is typical, it has been used to illustrate the invention in the following example. All parts are by weight unless otherwise noted.

*Example*

Monochloropyrazine was continuously vaporized, the vapors preheated to about 325° C. and the preheated vapors combined with chlorine gas preheated to approximately the same temperature and with super-heated steam at about 300° C. The steam:monohalogenopyrazine ratio was about 3.5:1 and about 3 mols of chlorine per mol of monochloropyrazine was used. The chlorine feed was split, half being directly combined just prior to entrance to the conversion chamber and the remainder at a point in the conversion chamber at which the temperature was about 425° C. A number of runs were made in which the average temperature in the conversion chamber after the second addition of chlorine varied from about 425–500° C. Total contact times were varied from 0.25 to 50 seconds. It was found that at average temperatures approaching the upper limit about 1 to 2 seconds gave good yields of dichloropyrazine and that at the lower temperatures about 20–50 seconds gave good results. Up to 475° C. results were good. At from 475°–500° C. production was satisfactory but side reactions became more pronounced. A few runs were made up to 550° C. and below 300° C. Above 525° C. production was unsatisfactory due to side reactions. At 300° C. and at as long as 50 seconds contact time production of dichloropyrazine was very slight. At 275° C. no reaction could be observed.

Products from the better runs were collected by condensation, neutralized with about 25% aqueous sodium hydroxide and the products recovered by distillation. The dichloropyrazine fraction separated as a heavy oil from the distillate. The aqueous portion of the steam distillate was extracted with benzene and the benzene extract was combined with the oily dichloropyrazine fraction and subjected to fractionation. A benzene water azeotrope was distilled off at atmospheric pressure. The residue was distilled at 50 mm. pressure, some monochloropyrazine coming off at 72°–75° C. and the dichloropyrazine fraction coming off at 94–100° C. Little trichloropyrazine was found but about 8% tetrachloropyrazine was recovered.

The dichloropyrazine fraction, by fractional distillation in accordance with my copending application with J. K. Dixon and J. F. Bruesch, Serial No. 25,986, now Patent No. 2,524,431, filed of even date, was separated into the 2,6-, 2,5- and 2,3-dichloro isomers. The solid separated from the first fractional distillation comprised the 2,6-dichloro isomer melting at 53°–54° C. The intermediate fractions were subjected to freezing and the resultant solid collected therefrom. This comprised the 2,5-dichloro isomer with a melting point at about 0° C. The solid separated from the last distillate fraction was the 2,3-dichloro isomer melting at 23°–24° C. The residue comprised tetrachloropyrazine.

Similar experiments on brominating monobromopyrazine produced a 2,6-isomer melting at 49°–52° C., a 2,5-isomer melting at 6.5–8.0° C., and a 2,3-isomer melting at 59–61° C. Contra to the results in chlorination, the larger proportion in residue comprised principally tribromopyrazine with very little tetrabromo isomer being produced. In general temperatures of 100°–125° C. higher than for chlorine substitution appeared to yield the best results.

I claim:

1. The improved method of producing polyhalogenopyrazines which comprises subjecting a continuous flow of a fully vaporized mixture, preheated to within 50° C. of the reaction temperature, of a monohalogenopyrazine, selected from the group consisting of monobromo and monochloropyrazine, and 1 to 5 mols per mol of the same halogen present in the monohalogenopyrazine to an elevated reaction temperature; maintaining a reaction temperature of from 325–625° C., the temperature being held at from 325–525° C. when the halogen is chlorine and from 425–625° C. when the halogen is bromine, maintaining the mixture at reaction temperature for a period of from 0.5 second at the higher temperatures up to 50 seconds at the lower temperatures; subjecting the reacted mixture to condensation; neutralizing the condensate with an alkaline wash; steam distilling the neutralized mixture and subjecting the distillation condensate to fractional distillation to separate the di-, tri- and tetrahalogenopyrazine fractions therefrom.

2. The improved method of producing polychloropyrazines which comprises subjecting a continuous flow of a fully vaporized mixture, preheated to within 50° C. of the reaction temperature, of a monochloropyrazine, and 1 to 5 mols of chlorine per mol of monochloropyrazine to an elevated reaction temperature; maintaining the reaction temperature of from 325–525° C. for a period of from 0.5 second at the higher temperatures up to 50 seconds at the lower temperatures; subjecting the reacted mixture to condensation; neutralizing the condensate with an alkaline wash; steam distilling the neutralized mixture and subjecting the distillation condensate to fractional distillation to separate the di- and tetrachloropyrazine fractions therefrom.

3. A process according to claim 1 in which the vaporized preheated mixture contains 2–10 mols of water vapor per mol of monohalogenopyrazine.

4. An isomeric dichloropyrazine mixture.

5. 2,5-dichloropyrazine.

6. 2,3-dichloropyrazine.

7. 2,6-dichloropyrazine.

ALEXANDER A. MILLER.

REFERENCES CITED

The following references are of record in the file of this patent:

UNITED STATES PATENTS

| Number | Name | Date |
|---|---|---|
| 2,391,745 | Sayward | Dec. 25, 1945 |

OTHER REFERENCES

McElvain et al., J. Am. Chem. Soc. 75, 2227–2231 (1943).

Erickson et al., J. Am. Chem. Soc. 68, 400–402 (1946).